(12) United States Patent
Zudrell-Koch et al.

(10) Patent No.: US 8,384,302 B2
(45) Date of Patent: Feb. 26, 2013

(54) OPERATING DEVICE FOR OPERATING A LIGHT SOURCE, IN PARTICULAR LED

(75) Inventors: Stefan Zudrell-Koch, Hohenems (AT); Alexander Barth, Alberschwende (AT)

(73) Assignee: Tridonic GmbH & Co KG, Dornbirn (AT)

( * ) Notice: Subject to any disclaimer, the term of this patent is extended or adjusted under 35 U.S.C. 154(b) by 290 days.

(21) Appl. No.: 12/664,346

(22) PCT Filed: Jun. 12, 2008

(86) PCT No.: PCT/EP2008/004727
§ 371 (c)(1),
(2), (4) Date: Aug. 20, 2010

(87) PCT Pub. No.: WO2008/151800
PCT Pub. Date: Dec. 18, 2008

(65) Prior Publication Data
US 2010/0301766 A1 Dec. 2, 2010

(30) Foreign Application Priority Data
Jun. 15, 2007 (DE) .......................... 10 2007 027 551

(51) Int. Cl.
H05B 41/36 (2006.01)

(52) U.S. Cl. ...................................... 315/291
(58) Field of Classification Search .......... None
See application file for complete search history.

(56) References Cited

U.S. PATENT DOCUMENTS

| 6,369,525 | B1 | 4/2002 | Chang et al. ................... 315/300 |
| 6,369,529 | B1 | 4/2002 | McClintock et al. ........... 318/16 |
| 2005/0218838 | A1 | 10/2005 | Lys ................................ 315/291 |
| 2006/0022916 | A1 | 2/2006 | Aiello ............................ 345/82 |
| 2006/0066258 | A1 | 3/2006 | Lane et al. ..................... 315/291 |
| 2007/0086128 | A1 | 4/2007 | Lane et al. ..................... 361/42 |

FOREIGN PATENT DOCUMENTS

| EP | 1 608 206 | 12/2005 |
| EP | 1608206 A1 * | 12/2005 |

OTHER PUBLICATIONS

International Search Report PCT/EP2008/004727, mailed Sep. 4, 2008.
International Search Report, PCT/EP2008/004727, mailed Sep. 4, 2008.

* cited by examiner

Primary Examiner — Crystal L Hammond
(74) Attorney, Agent, or Firm — Winston & Strawn LLP (57) ABSTRACT

The invention relates to an operating device for operating an LED light source. The device includes a first power converter stage (P1) supplied with mains voltage with a first reference potential (Z1), a second power converter stage (P2) with a second reference potential (Z2), which is connected to the secondary side of the first power converter stage (P1) via a first potential isolation unit (G1), a digital control unit (C1), which, via a second potential isolation unit (G2), controls the first power converter stage (P1) and the second power converter stage (P2) without potential isolation, at least one power switch (S2) which clocks the converter stage (P2), and an illuminant (L), which is supplied with energy by the second converter stage (P2).

19 Claims, 8 Drawing Sheets

OPERATING DEVICE FOR OPERATING A LIGHT SOURCE, IN PARTICULAR LED

This application is a 371 filing of International Patent Application PCT/EP2008/004727 filed Jun. 12, 2008.

BACKGROUND

The present invention relates in general to the field of operating devices for illuminants, for example, gas discharge lamps or light emitting diodes (LEDs).

In different areas of application within lighting technology, especially in the field of LEDs, OLEDs and emergency lighting, there is a requirement to provide a galvanic isolation comparable with electronic transformers, so that the installation need not necessarily be implemented by a qualified technician. Accordingly, the light source and/or the electronic control circuit should operate on a potential galvanically isolated from the mains supply voltage.

The use of a two-stage approach is already known. In this context, a converter, which drives the illuminant, is controlled with potential isolation via a control circuit at the mains voltage side (primary side of the potential isolation). If feedback signals from the secondary side of the potential isolation, that is to say, especially from the region of the illuminant, are to be fed back to the control circuit, a potential isolation is also provided for this feedback. The control on the secondary side of the potential isolation is implemented through a further control circuit, which is one isolated from the first-named control circuit disposed at mains voltage potential.

From EP1608206A1, it is known that the control information can be transmitted in an electrically isolated manner, while the actual control circuit itself is not electrically isolated.

SUMMARY OF THE INVENTION

The invention now provides an improved technology for potential isolation in operating devices for illuminants.

This object is achieved by the features of the independent claims. The dependent claims develop the central idea of the invention in a particularly advantageous manner.

A first aspect of the invention relates to an operating device for operating a light source, especially an LED, comprising:
- a first power converter stage supplied with mains voltage with a first reference potential,
- a second power converter stage with a second reference potential, which is connected to the secondary side of the first power converter stage via a first potential isolation element,
- a preferably digital control unit, which via a second potential isolation element controls the first power converter stage and the second power converter stage without potential isolation,
- at least one power switch which clocks the converter stage,
- an illuminant, which is supplied with energy by the second converter stage.

The first converter stage can provide at least one power switch, which is controlled through the control unit with potential isolation.

The second converter stage can provide at least one power switch, which is controlled through the control unit preferably without potential isolation.

In one simple embodiment, the second converter stage can be designed without active control of a power switch.

The control of the second power converter stage by the preferably digital control unit can be implemented through the control of the first power converter stage via a second potential isolation element and through a feedback of signals from the second power converter stage without potential isolation. The term "control" is therefore understood also to cover the registration of feedback signals from the corresponding power converter stage.

The second power isolation element is integrated into the control unit, for example, by means of integrated air-core coil, or is designed as an external transformer.

On the secondary side of the first potential isolation element, an energy storage element, for example, in the form of a capacitor or a battery, can be provided, at which a stabilised intermediate voltage is provided for the supply of the second converter stage.

A further aspect of the invention relates to an operating device for operating a light source, in particular an LED, comprising:
- a first power converter stage supplied with mains voltage with a first reference potential,
- a second power converter stage with a second reference potential, which is connected to the secondary side of the first power converter stage via a first potential isolation element,
- a preferably digital control unit, which without potential isolation controls the first power converter stage and via a second potential isolation element the second power converter stage,
- at least one power switch which clocks the converter stage, and
- an illuminant, which is supplied with energy by the second converter stage.

Feedback signals, which are all picked up on the primary side of the first potential isolation element, can be fed back to the control unit.

Feedback signals from the secondary side of the first potential isolation element can be fed back to the control unit with potential isolation or optically.

The first converter stage and the first potential isolation element may be integrated in a circuit.

The first converter stage and the first potential isolation element can be designed in the form of a fly-back converter (fly-back converter) or a forward converter, which is preferably operated in a discontinuous manner.

The first converter stage and the first potential isolation element can be designed in the form of a forward converter, which is operated in a resonant discontinuous manner.

External information or instructions can be supplied to the operating device.

According to a further aspect of the invention, the illuminants can be supplied selectively starting from an energy store via the second converter stage or directly starting from a supply voltage, especially mains voltage, via the first converter stage.

The first converter stage can be a combined converter stage, which forms a combined fly-back converter and forward converter, wherein one of fly-back converter and forward converter supplies the illuminant directly and the respectively other charges an energy store.

A further aspect of the invention relates to an emergency lighting unit, which provides an illuminant, especially one or more LEDs and an operating device of the type explained above, wherein the failure of the mains voltage supply is detected, in order to operate the illuminant immediately afterwards starting from an autonomous voltage supply, in particular a battery.

BRIEF DESCRIPTION OF THE DRAWINGS

Further features, properties and advantages of the invention will now be explained with reference to the accompanying drawings on the basis of purely illustrative exemplary embodiments.

DETAILED DESCRIPTION OF THE INVENTION

Figure 1:
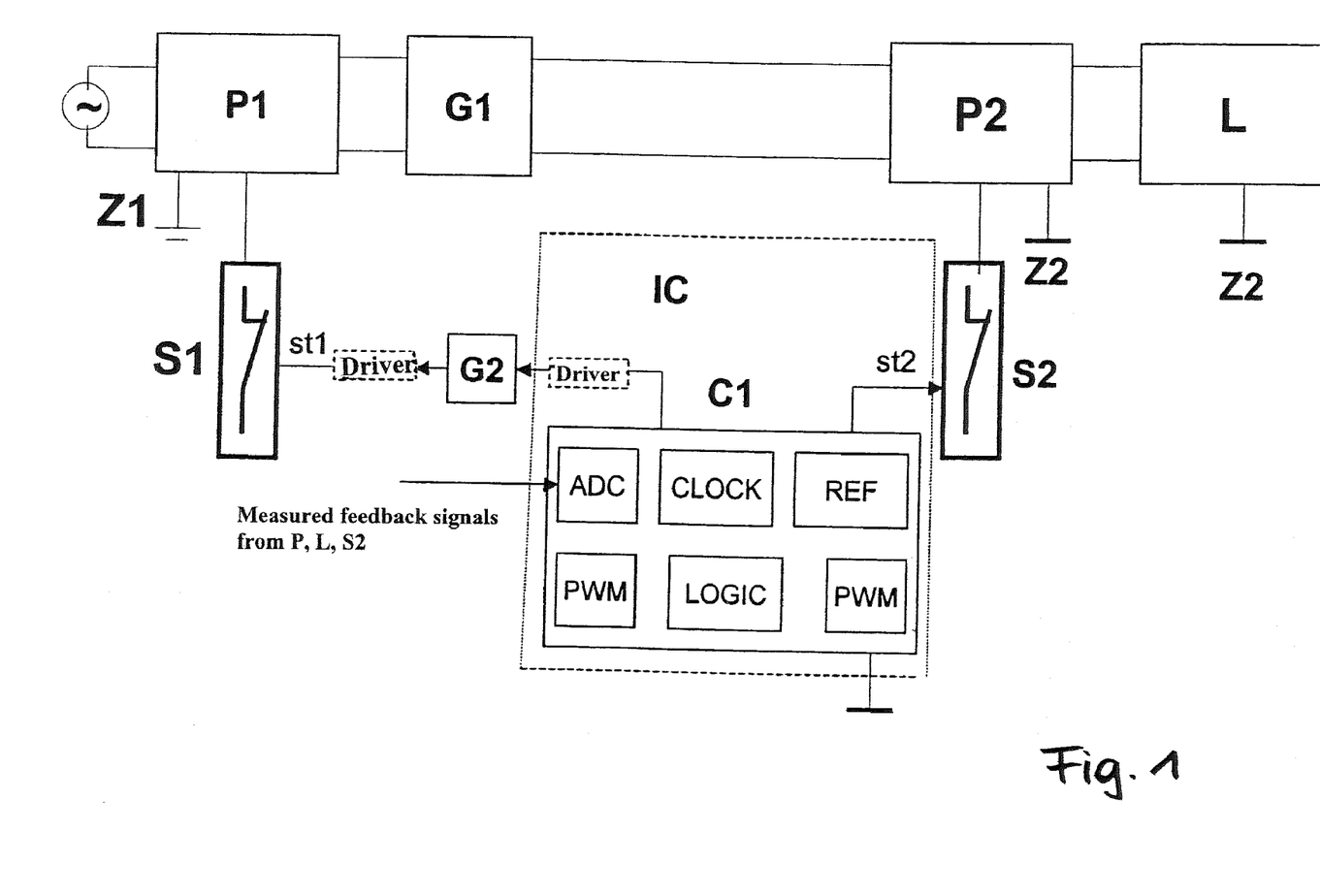
FIG. 1 shows a schematic view of the operating device for illuminants, in particular for LEDs, according to the present invention.

The present invention describes such a system. A power converter stage P1 is supplied with an alternating voltage and has a reference potential Z1. The power converter stage P1 is clocked by a switch (for example transistor) S1.

A control unit C1 (for example, an IC, such as an ASIC, especially, designed as a digital circuit) controls, for example, by means of PWM signals, the switch S1 via a galvanic isolation G2. The preferably digital control unit C1 can provide an internal driver. Alternatively or additionally, a driver can also be provided between the galvanic isolation G2 and the switch S1. In this context, a driver for the (for example, MOSFET) switch S1 can be provided upstream of the galvanic isolation and/or downstream of the galvanic isolation G2.

Feedback signals, which are evaluated as actual values for controlling the illuminant operation, can be fed back to the digital control unit C1. The feedback signals here can originate from the region of the load circuit L, which provides the illuminant (for example, one or more LEDs), from the region of a further switch S2 (for example, switch current with switch S2 switched on) or from one of several power converter stages (converters) P1, P2.

G1 and G2 can be transformers. In this context, the transformers G1, G2 can be wound on the same core.

The digital control unit C1 provides a clock (clock), an AD converter (ADC), reference voltages, a logic circuit and PWM (pulse-width modulation) driver for the switches S1 and S2.

Several analog/digital converters ADC for the feedback signals and two digitally operating control loops are preferably provided within the control unit C1. In this context, the first control loop is responsible for controlling the switch S1 of the power converter stage P1, and the second control loop for controlling the switch S2 of the power converter stage P2. The two digital control loops each provide a logic circuit, to which at least one A/D converted signal is supplied, and in each case one PWM (pulse-width modulation) driver, starting from which the respectively allocated switch is controlled.

Moreover, an operating state control block ("state machine") is provided, which communicates to the logic circuit of the control loops operating-state information regarding the current operating phase ("state") of the illuminant or also of the operating device (for example, if an emergency lighting mode is provided). All components of the control unit C1 are synchronised via a central clock (clock), which communicates corresponding clock signals to the components. The control unit C1 is preferably designed as an application-specific integrated circuit (Application Specific Integrated Circuit—ASIC) and accordingly requires only a small space.

In the following section, the method of functioning of the first control loop for controlling the power converter stage P1 will be explained. For this purpose, the operating parameters or feedback parameters already mentioned above—for example, the output voltage of the power converter stage P1—are registered and converted using analog/digital converters ADC into digital values with an accuracy of at least 2 bits, preferably of 12 bits.

The digital value of the output voltage of the power converter stage P1 generated by the first analog/digital converter ADC, which is initially supplied to the logic circuit (logic), is of primary importance for this first control loop. On the basis of this value, the logic circuit (logic) calculates a corresponding control information for the switch S1 in the form of a digital value, which is stored in a buffer register. This value contains information regarding the required on-time or the duty factor for the switch S1.

In this context, the calculation is implemented taking into consideration the current value in the buffer register and the operating state information transmitted from the state machine. Consideration of this operating-state information guarantees that the control properties can be matched to the current operating state of the illuminant or also of the operating device, which is important because different dynamic control properties may be desired in different operating phases. Accordingly, it is desirable, for example, during an emergency lighting operation, to select as energy-saving a method of operation as possible, in order to utilise the available battery charge in this phase as effectively as possible. This can be achieved, for example, by a so-called burst operating mode (control in pulse packets with subsequent pause). By contrast, during normal operation of the operating device, a control dynamic should be provided, with which rapid changes in brightness are also primarily allowed.

The value stored in the buffer register is finally converted by the PWM (pulse-width modulation) driver of the control loop into a corresponding switch information, which transmits a corresponding control signal for the operation of the switch S1 via the control signal st1 via a galvanic isolation G2.

It should be noted that, contrary to the schematic presentation in FIG. 1, the control unit C1 preferably provides only a single analog/digital converter in practice, which is operated in time multiplex and converts the operating parameters supplied via the input lines successively into the required digital values. The conversion of the operating parameters registered by the power converter stage P2 for the control of the power converter stage P2 as described below can also be implemented by this single analog/digital converter.

The control of the power converter stage P2 using the second control loop is implemented in a similar manner to the control of the power converter stage P1, wherein digital operating parameters generated by the jointly-used analog/digital converter operating, for example, in time multiplex are supplied to the logic circuit (logic); dependent upon this, the logic circuit calculates a corresponding switch information and transmits this to the PWM (pulse-width modulation) driver. Here also, different control properties are realised using the state machine in different operating phases of the illuminant or also of the operating device.

The first power converter stage P1 is connected via a galvanic isolation G1 to a second power converter stage P2, which provides a second reference potential Z2 different from the first reference potential.

The power converter stages P1, P2 can be designed as forward converters, as fly-back converters or also as other galvanically isolated converter circuits.

A switch S2, which is also controlled by a PWN unit of the control unit C1 (without potential isolation), clocks the second power converter stage P2.

According to the invention, a single circuit (especially a single IC such as an ASIC) can therefore control (electrically isolated) a converter P1 at mains voltage potential and also (without galvanic isolation) the converter P2 galvanically isolated from the mains voltage.

The second power converter stage P2 supplies a load circuit, which provides the illuminant L or consists only of the latter and which provides the same reference potential as the second power converter stage P2.

The invention therefore provides an operating device for operating a light source, especially an LED. The operating device can provide:
  a first power converter stage P1 with reference potential Z1,
  at least one power switch S1 which clocks the converter stage P1,
  a digital control unit C1 consisting of a clock ("clock"), an AD converter (ADC), reference voltages, a logic circuit and a PWN (pulse-width modulation) driver,
  a galvanic decoupling G1,
  a second power converter stage P2 with reference potential Z2,
  at least one power switch S2 which clocks the converter stage P2,
  a light source L with reference potential Z2, wherein the light source is supplied with energy by the converter stage P2,
  the control signal st1 of the first switch S1 is connected via a galvanic isolation G2 to the control unit C1.

According to the invention, the entire regulation and control logic circuit can be disposed on the secondary side of the galvanic isolation. Furthermore, the entire regulation and control logic circuit can be integrated on the secondary side of the galvanic isolation in an IC (the isolated control can also be integrated, for example via integrated air-core coil or via a further high-frequency transmission option).

Figure 2:
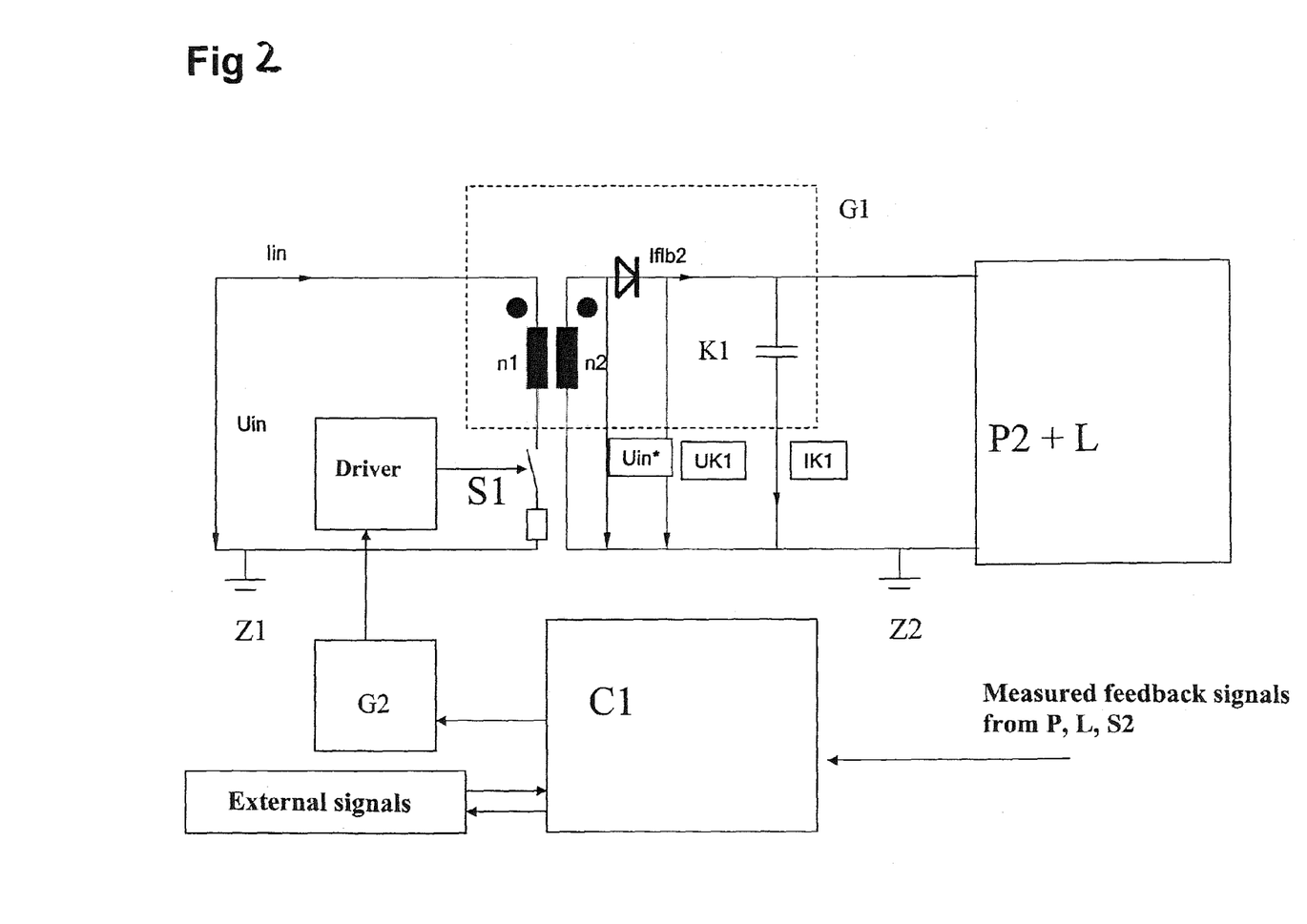
FIG. 2 shows an embodiment, wherein a first potential isolation stage is designed as a forward converter (forward converter), which is operated in a discontinuous operating mode.

With reference to FIG. 2, a further exemplary embodiment of the invention will now be explained. In this exemplary embodiment, the first converter stage P1 and the first potential isolation G1 are designed in an integrated manner. More precisely, in this exemplary embodiment first converter stage P1 is designed as a forward converter, wherein a transformer with windings n1, n2 on the primary side is therefore clocked via the switch S1. The two windings n1 and n2 are wound in the same direction, so that the transmission of energy is always implemented when the switch S1 controlled through the digitally integrated control unit C1 is switched on via the potential isolation stage G2. The mains voltage, which is referred to as $U_{in}$ and is converted at the output end into a voltage $U_{out}$, is therefore connected at the primary side of the forward converter, that is to say, at the winding n1. Via a diode, a current $I_{FLB2}$ charges an energy storage element K1, at which a voltage $U_{K1}$ is present. This energy storage element K1 can, for example, be a capacitor or a battery. Accordingly, a stabilised intermediate voltage $U_{K1}$ is adjusted at the energy storage element K1, starting from which the second converter stage P2 and the illuminant L can be supplied.

As shown in FIG. 2, the digitally integrated control unit C1 can be designed in order to receive external signals or respectively, for example, to output signals via a connected bus line. The signals can, for example, be instructions (such as turn-on or turn-off instructions or dimmer value specifications) or status information (especially information regarding a mains power failure in the case of the use of the invention for emergency lighting).

In the case of the embodiment of FIG. 2, feedback signals from the second converter stage P2, from the illuminants L or from the switch S2 of the second converter P2 can be fed back to the digitally integrated control unit C1. This can be implemented without potential isolation, because the digitally integrated control unit C1 according to the exemplary embodiment of FIG. 2 is in fact decoupled with reference to the mains voltage side via the potential isolation element G2.

The resonant discontinuous operation of the forward converter allows a considerable reduction in the switching losses and therefore also a reduction of the components required. If a capacitor K2 is arranged on the primary side of the forward converter in parallel or also in series to the coil n1, an isolation between the coil n1 and the capacitor K2 can be achieved through a corresponding choice of the switching frequency. If this oscillation is disposed within the range of the switching frequency of the control of switch S1, this can then always be switched on when the voltage across the switch S1 in fact has a low value. The power loss due to switching is then minimised at the moment of switching. With a corresponding design of the coil N1 and the capacitor K2, the switching frequency can be selected in such a manner that a resonant and therefore loss-optimised operation of this kind can be achieved by operating the forward converter with nominal power.

A resonance element corresponding to the capacitor K2, which allows a resonant operation by exploiting a resonance circuit in conjunction with the coil n1, can, however, also be disposed on the secondary side of the forward converter or can also be integrated into the circuit as a parasitic capacitor, for example, in the transformer.

Figure 3:
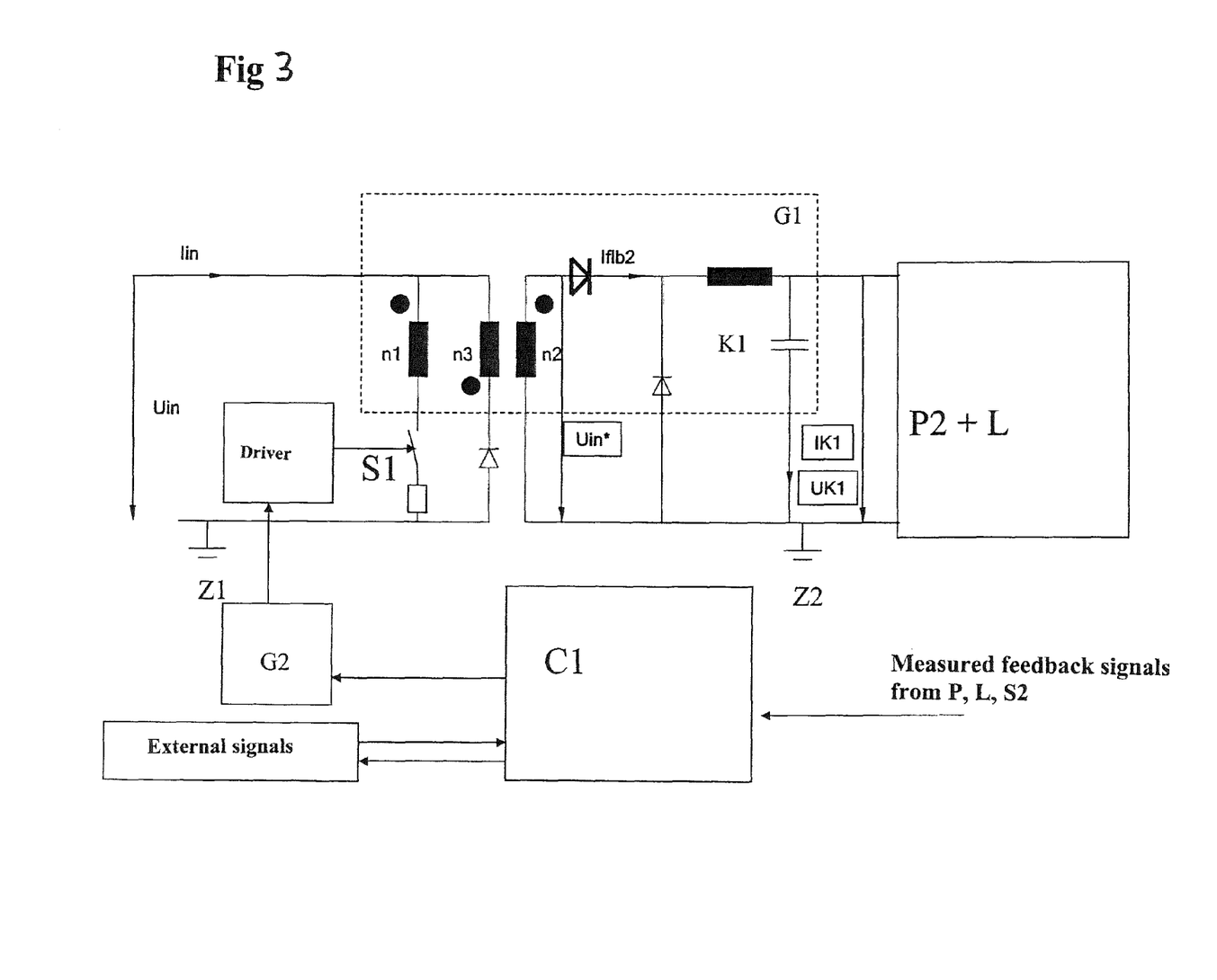
FIG. 3 shows a variation of FIG. 2 to the effect that the forward converter is designed for a continuous manner of operation.

FIG. 3 shows a variation of the exemplary embodiment of FIG. 2 to the effect that the forward converter is now designed for continuous operation ("continuous mode"). For this purpose, a third winding n3, to which a diode is connected in series, and wherein the winding of the third coil n3 is in the opposite direction to the first coils n1 and n2, is provided substantially on the primary side. This coil n3 is used to suppress the magnetisation of the primary-side coil n1.

One possible expansion of the forward converter according to the exemplary embodiment of FIG. 3 is the addition of a smoothing choke after the diode, which carries the current IFLB2, and of a further diode, of which the cathode is connected between this diode (D_IFLB2) and the smoothing choke and of which the anode is connected to the end of the coil n2, which is not connected to the diode (D_FLB2). A further smoothing of the voltage UK1 can be achieved by the addition of these two components. This addition of the two smoothing elements is also otherwise possible with all of the other exemplary embodiments.

Figure 4:
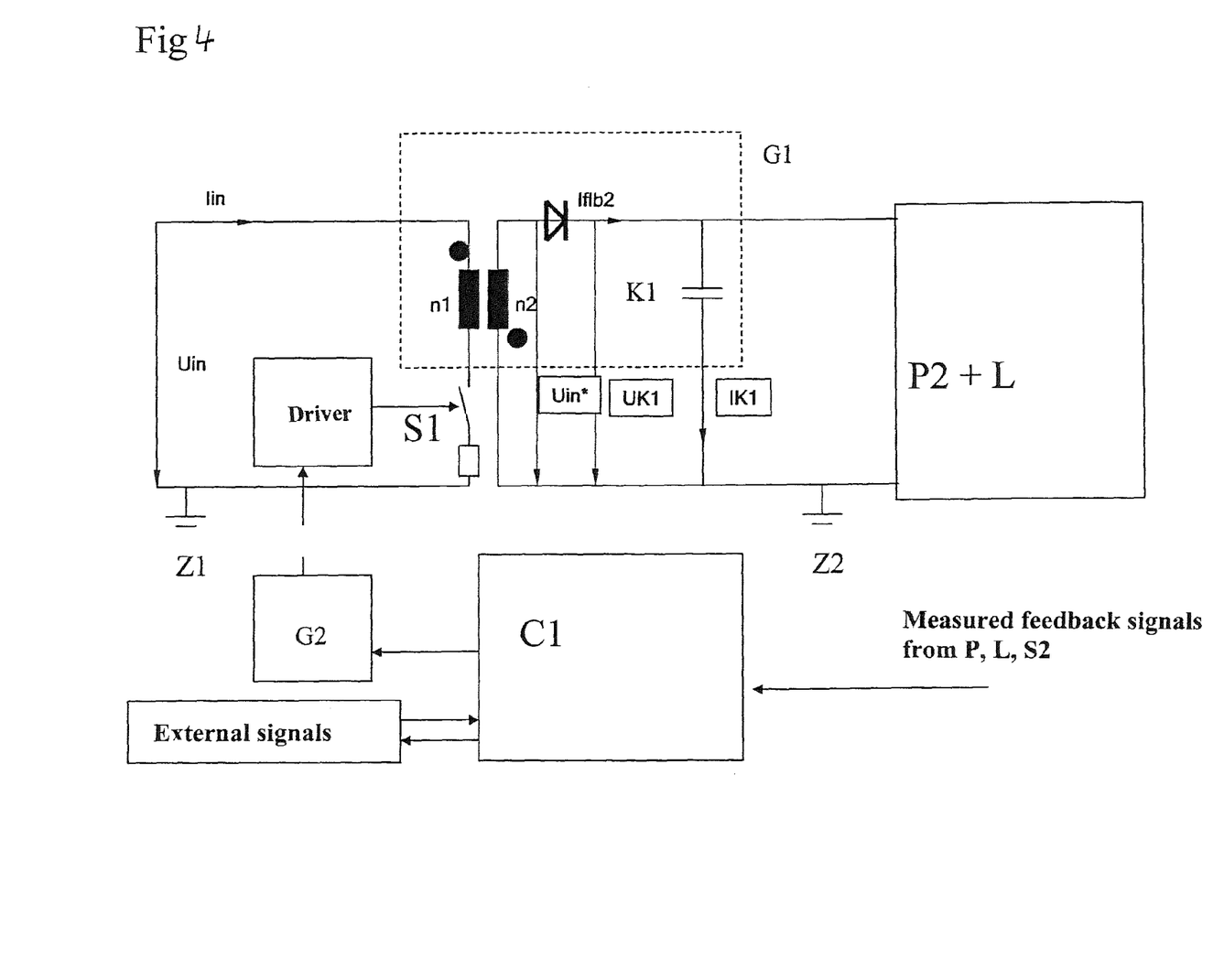
FIG. 4 shows an embodiment, wherein the first potential isolation stage is designed as a fly-back converter.

FIG. 4 shows a further exemplary embodiment that differs from the exemplary embodiments according to FIG. 2 and FIG. 3 in that the first converter stage P1 is designed together with the potential isolation G1 as a fly-back converter (fly-back converter). Accordingly, in this context, a transformer with windings n1 and n2 is once again provided, which is clocked at the primary side via the switch S1, which is once again controlled in an electrically isolated manner through the potential isolation G2 by the digitally integrated control unit C1. However, in the case of the fly-back converter, it is provided that the windings n1 and n2 are wound in opposite directions. Accordingly, the fly-back converter then transmits energy to the secondary side, when the switch S1 controlled by the digitally integrated control unit C1 is opened.

Figure 5:
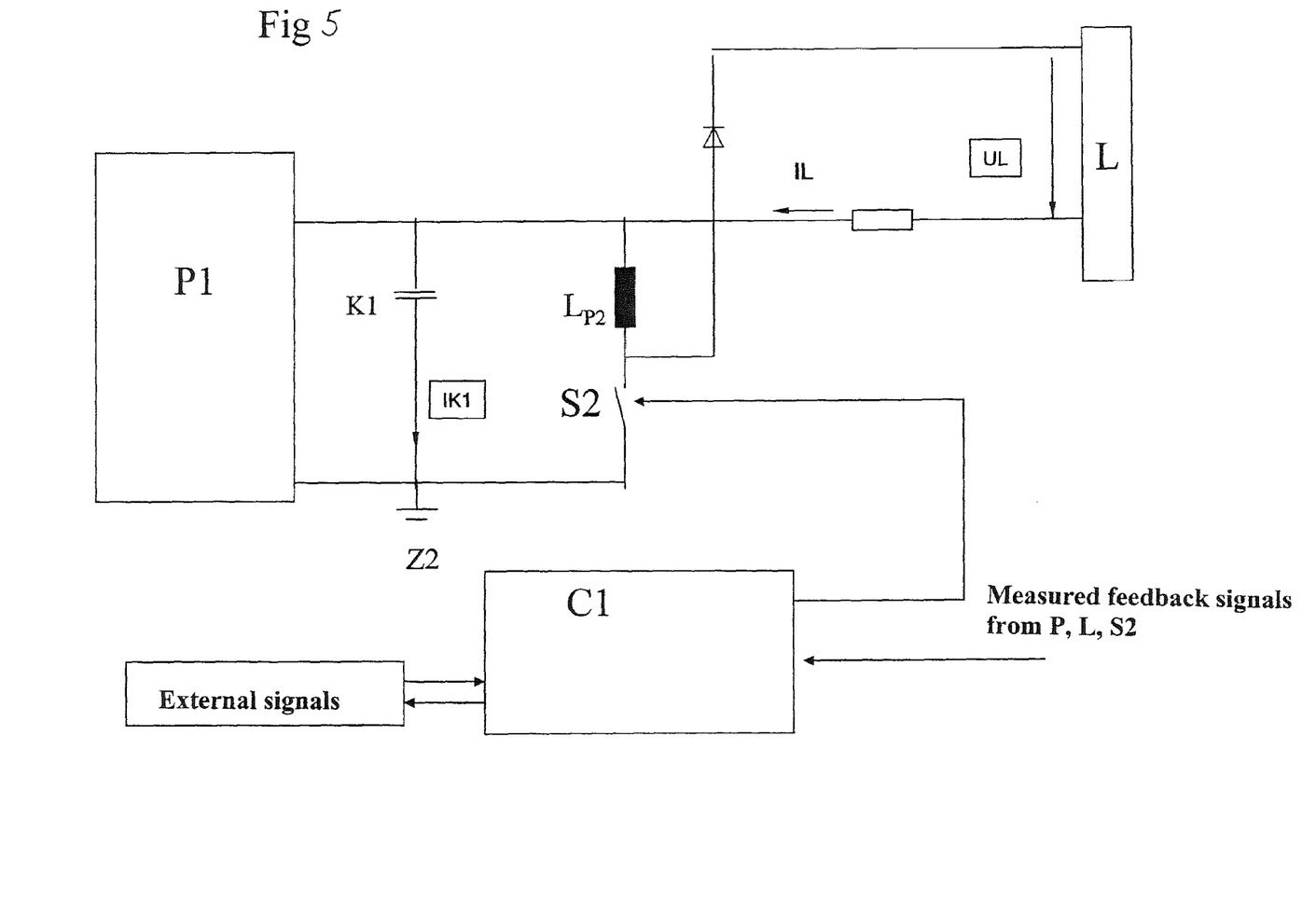
FIG. 5 shows an embodiment, wherein the second converter stage is designed as a buck-boost converter.

FIG. 5 now shows in detail one possible embodiment of the second converter stage, wherein this second converter stage P2 according to FIG. 5 can be combined with each of the examples of the first converter stage P1 with potential isolation G1 according to the drawings FIG. 2, FIG. 3 or FIG. 4.

Accordingly, with this switching controller according to FIG. 5, an illuminant L, at which a voltage $U_L$ is released and through which a current $I_L$ flows, is supplied starting from the stabilised intermediate voltage at the energy storage element K1.

In this case, the digitally integrated control unit C1 controls the switch S2 of the second converter stage P2, which is connected in series to an inductance $L_{P2}$, without potential isolation. Through the selection of the frequency and/or of the duty factor of the control of the switch S2, the voltage at the energy storage element K1 can therefore be raised or lowered within a relatively wide range to a voltage appropriate for the operation of the illuminant L.

Figure 6:
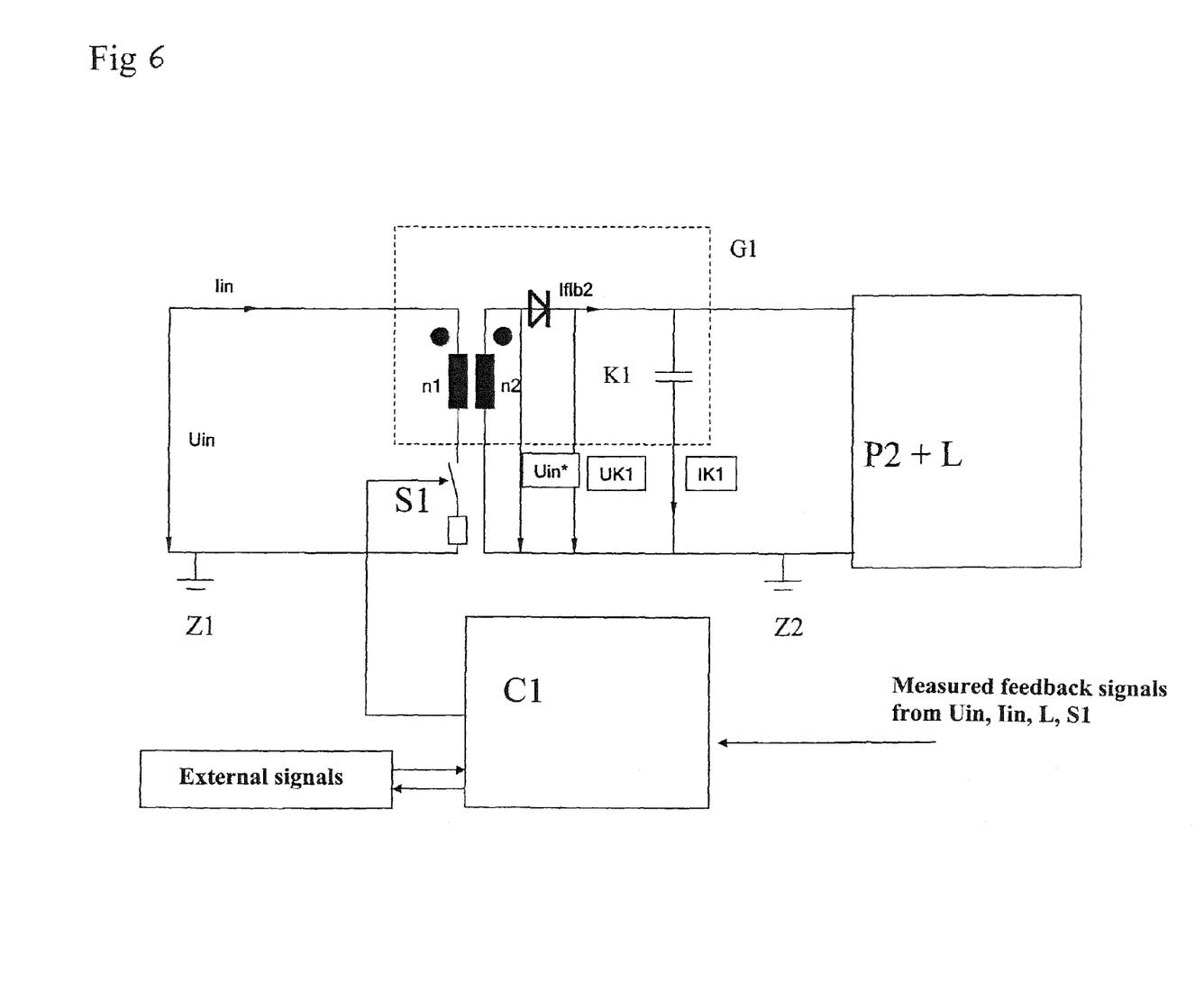
FIG. 6 shows an embodiment, wherein the digitally integrated control circuit is not galvanically isolated from the mains voltage potential, and the first converter stage is designed as a forward converter.

FIG. 6 now shows an exemplary embodiment, which basically differs from the exemplary embodiment according to the implementation of FIG. 2 to FIG. 5 in that, now, the digitally integrated control unit C1 is not isolated from the mains voltage side, that is to say, in this case, the primary side integrated potential isolation/converter circuit P/G1. Accordingly, without the potential isolation, the digitally integrated control unit C1 controls the first converter stage P1 and, expressed more precisely, in this example, a switch S1 in series to the primary-side winding N1 of the forward converter.

Of course, the control without potential isolation, starting from the digital integrated control circuit C1, also together with a fly-back converter, as shown in FIG. 4, can use respectively a forward converter designed for the continuous operating mode according to FIG. 3.

The exemplary embodiment of FIG. 6 is also suitable for a resonant discontinuous operation of the forward converter. If a capacitor K2 is arranged on the primary side of the forward converter in parallel or also in series to the coil n1, with a corresponding selection of the switching frequency, an oscillation can be achieved between the coil n1 and the capacitor K2.

The use of the capacitor K2 can also be implemented for a further purpose. If the circuit is operated in the non-continuous mode, oscillations, which result from the formation of an oscillation circuit, become effective in the switching phase. The oscillation circuit is formed through the transformer inductances and switching capacitances and/or stray capacitances. Now, in order to allow as far as possible no switching losses to occur, the switching of the electronic switch element should be implemented precisely when the oscillations have a zero pass. For this purpose, it is necessary to influence the frequency of these oscillations. This is achieved through the introduction of additional capacitances, for example, the capacitor K2. With an appropriate dimension of this capacitor K2, the switching then occurs precisely at the zero pass or in the proximity of the zero pass. The voltage across the switch S1 is measured and supplied to the control circuit C1. The operating frequency is obtained by detecting the switching-on time. The output voltage (or the transmitted energy) is determined through the duty factor of the PWM switching signal.

The monitoring of the voltage across the switch S1 and of the current through the switch S1 can be used to detect whether a resonant operation and accordingly a normal operating status is present or an error, for example, an overload or an absence of load ("no load"). In the case of an error, the connected load no longer corresponds to the rated power. This means that the demagnetization of the coil N1 no longer occurs at the specified time, but occurs prematurely or with a delay or not at all. In the case of a monitoring of the demagnetization time by monitoring the voltage across the switch S1, an error of this kind can be determined. Through the digital implementation of the control unit C1, a direct sampling (sampling) of the feedback signals and therefore of the voltage across the switch S1 can be implemented at several times during a switching cycle. The feedback parameters can be stored in the buffer register, and the time characteristic for the detection of the presence of an error can be evaluated by the logic circuit.

As already explained, the duration of the on-time determines the level of the transmitted energy and therefore the output voltage. Through the time sampling of the current through the switch S1 after switching on the switch S1, the current characteristic and accordingly the magnetisation of the coil n1 can be monitored. The phase position of the current characteristic and the rise can be evaluated via the logic circuit and reflect the power requirement of the forward converter. In the case of a negative current after switching on, an under-load can be inferred, since the voltage at the coil n1 during the restoration of the switch S1 (because of the specified phase locked loop) is already disposed close to the negative maximum because of the low load, and accordingly, a negative restoring current is obtained. By storing the feedback parameters and control information of the logic circuit in the buffer register, the logic circuit can also determine the on-time necessary for the control of the switch S1 by evaluating the time characteristic during the preceding switching cycles and transmit this to the PWM (pulse-with modulation) driver.

Through a corresponding selection of the on-time of the switch S1 and by placing of a capacitor K2 as a resonance element, the forward converter can also assume the function of an active (that is to say, fitted with a controlled switch) power-factor correction circuit (PFC). This function of the power-factor correction circuit (PFC) can be achieved, for example, through a discontinuous operation of the forward converter with a very low turn-on factor but also through a continuous operation of the forward controller by placing the capacitor K2 on the secondary side parallel to the secondary-side diode (no-load diode). If the control unit C1 registers the input voltage $U_{in}$ as a feedback signal, the turn-on factor or respectively the turn-on duration of the switch S1 can be controlled in such a manner that the current taken up by the coil N1 follows on average the characteristic of the sinusoidal input voltage $U_{in}$.

Figure 7:
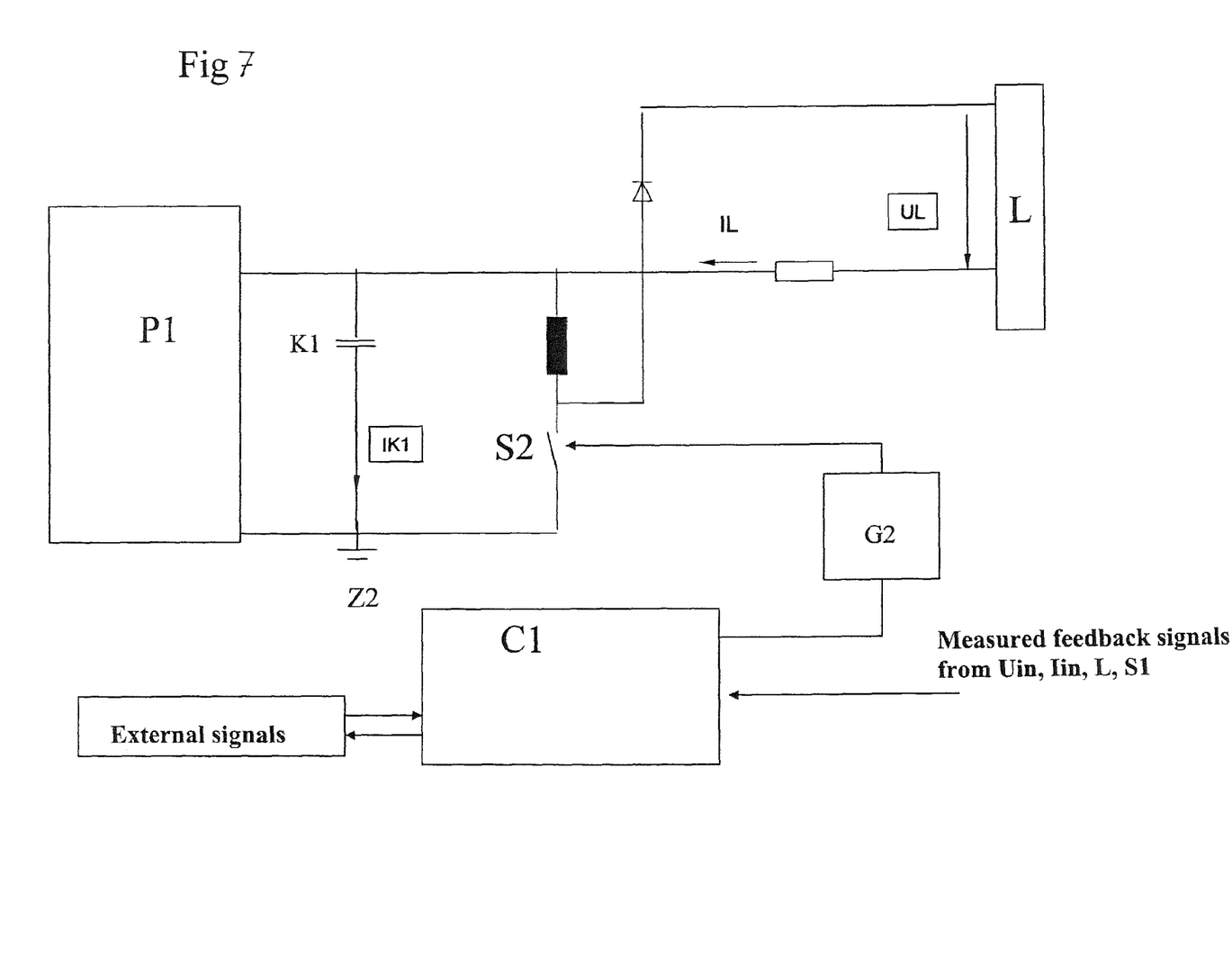
FIG. 7 shows a variation of FIG. 6 to the effect that the second converter stage is designed as a buck-boost converter.

Accordingly, if the digitally integrated control unit C1 is not electrically isolated from the mains voltage, as shown in FIG. 6, the control of the second converter stage P2 and, in the illustrated case, of the switch S2 of the second potential converter stage P2, is preferably implemented as shown in FIG. 7 starting from the digitally integrated control circuit C1 via a potential isolation element G2.

Figure 8:
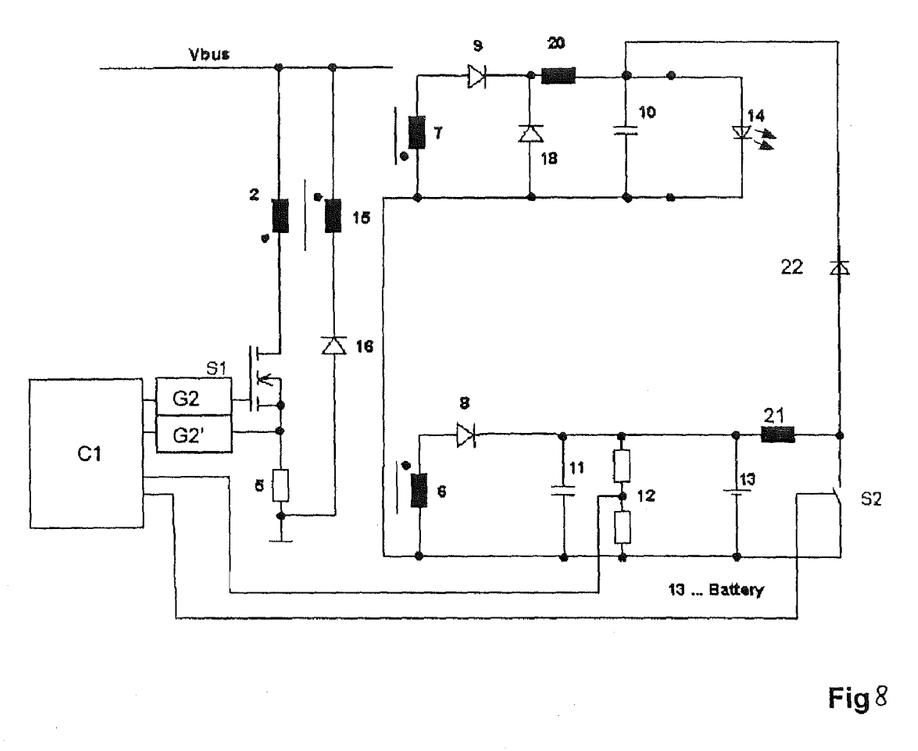
FIG. 8 shows an exemplary embodiment with combined first converter stage.

With the embodiment of FIG. 8, a fly-back converter with windings 2, 6 for charging a battery 13 is coupled to a forward converter (windings 2, 7) for the operation of an LED 14. Furthermore, the LED 14 can also be operated via a second switching stage (by means of the switch S2) starting from the battery 13, if no mains voltage is connected.

The primary-side switching stage P1 is formed by the primary winding 2 and the no-load winding 15 with the no-load diode 16 and the optional current shunt 5. The energy consumption through P1 is controlled through the switch S1. The switch S1 is controlled via an electrically isolating element G2 through the IC C1. The optional current shunt 5 can either transmit a feedback or error signal to the IC C1 via an electrically isolated path G2' or deactivate the switch S1 directly in the event of an error via a direct cut-out.

The transformer with its primary winding 2, the no-load winding 15 and the secondary windings 6 and 7 forms the electrically isolating element G1.

The capacitors 10 and 11 and the rechargeable battery 13 form the energy store K1.

The switching stage P2 is formed from the secondary sides 6, 7 of the transformer and the buck-boost converter downstream of the rechargeable battery 13 with the switch S2. The switching stage P2 can, however, also be formed, for example, by a buck-converter or also by a boost converter.

The buck-boost converter downstream of the rechargeable battery 13 is controlled by the switch S2 and formed by the choke 21 and the no-load diode 22. When the switch S2 is switched on, the choke 21 is magnetised. If the switch S2 is opened, the choke 21 continues to drive the current through the diode 22, the LED 14 via the feedback path (via 6 and 8). Because of the charge of the capacitor 10 and the voltage ratio, a current can also flow through the LED 14 during the charging phase (S2 on).

The charging circuit for the rechargeable battery 13 is formed by the secondary side 6 and the diode 8 and a smoothing capacitor 11. On the basis of the voltage divider 12, the IC C1 can infer the charging voltage and also the voltage on the primary side of the transformer and accordingly the mains voltage.

The LED operating circuit for the system operation is formed through the secondary side 7 and the diode 9 and 18, a smoothing choke 20 and a smoothing capacitor 10, which form the secondary side of a forward converter.

It is possible to arrange the coil 20 on the common core of the transformer of the combined forward and fly-back converter. Since an emergency lighting mode is required only in the event that no mains voltage is connected, no influence of the fly-back or forward converter can occur during the operation of the coil 20 in the emergency lighting mode. With an appropriate arrangement of the windings on the different core limbs of the jointly used ferrite core, any mutual influence of the windings can still be reduced to a minimum.

In this context, the individual windings can be arranged on the common core in such a manner that the transformer windings 2, 7, 6 are decoupled against the choke winding 21 and vice versa. The transformer windings 2, 7, 6 and the choke winding 21 can be mounted on and arranged in such a distributed manner that the magnetic fluxes generated by the choke winding 21 induce contrary currents in the transformer windings 2, 7, 6, and the magnetic fluxes generated by the transformer windings 2, 7, 6 extend in such a manner that they flow past the choke winding and do not induce any current in it. For example, a so-called E-core can be used as the structural form. The common core can consist of two outer limbs and one central limb and yoke parts bridging these three limbs at both ends, so that the choke winding 21 are [?] arranged distributed wound in halves and in the same direction on different limbs of the common core, that the transformer windings 2, 7, 6 are arranged on the third core, and that the third limb is provided with an air gap.

The combination of forward converter and fly-back converter allows an independent control of the two secondary sides. While the transmitted power of the fly-back converter depends strongly upon the turn-on factor of the switch S1, a constant power can be transmitted through a corresponding design of the forward converter (primarily selection of the core of the transformer) over a broad range of turn-on factors. Accordingly, there is the possibility that the rechargeable battery 13 is recharged according to its charging curve, while the LED(s) 14 is/are operated uniformly (uniform brightness is achieved in this manner).

If the adjustment of the brightness of the LED is important and the charging of the rechargeable battery 13 is only of secondary importance, the allocation of forward converter and fly-back converter can be reversed.

With the embodiment according to FIG. 8, the control unit C1 can also be arranged on the primary side (that is to say, not be galvanically decoupled relative to the primary side) and the control of the switch S2 can be implemented through a galvanic isolation. The control of the two power converter stages P1 and P2 can be implemented by registering feedback signals on the primary side, for example, by registering the voltage across the switch S1 and the current through the switch S1. Corresponding to the description of the exemplary embodiment according to FIG. 6, in this case also, the control unit C1 can perform the feedback-control on the basis of feedback signals captured on the primary side. In the case of a power failure, which can be registered by monitoring the input voltage $U_{in}$, the switch S2 is clocked by the control unit C1 via a galvanic isolation and accordingly, the illuminant is operated via the power converter stage P2.

In one simple embodiment, for example, without emergency lighting function, the rechargeable battery 13 and the charging circuit and the buck-boost converter for driving the LED in emergency lighting mode can be omitted. In this case, the power converter stage P2 is formed only by the secondary-side elements of the forward converter for the operation of the LED. A feedback of feedback signals can also be implemented via an electrically isolated transmission in the power converter stage P2 or at the illuminant and supplied to the control unit C1.

A typical application of a converter of this kind is an emergency lighting unit with LED, for example, for so-called "EXIT" signs (escape-route indicator) or also for escape-route lighting.

According to the exemplary embodiment of FIG. 8, the control unit C1 therefore controls in an electrically isolated manner a combined converter stage C1, which, on the one hand, supplies an energy store and, on the other hand, in parallel to this, supplies the illuminant. By means of the energy store 13, a second converter stage with the switch S2 (which is not driven in an electrically isolated manner by the control unit C1) can then supply the illuminant 14 in a selective manner.

What is claimed is:

1. An operating device for operating a light source, comprising:
   a first power converter stage supplied with mains voltage with a first reference potential,
   a second power converter stage with a second reference potential, which is connected to the secondary side of the first power converter stage via a first potential isolation element, a control unit which via a second potential isolation element controls a power switch of the first power converter stage and the second power converter stage without potential isolation, at least one power switch which clocks the converter stage, and an illuminant, which is supplied with energy by the second converter stage.

2. The operating device according to claim 1, wherein the second converter stage provides at least one power switch, which is controlled by the control unit preferably without potential isolation, or both the first and second converter stages provide at least one power switch.

3. The operating device according to claim 1, wherein the light source is a LED, the control system is a digital control system and the second potential isolation element is either integrated in the control unit or is formed as an external transformer.

4. The operating device according to claim 1, wherein on the secondary side of the first potential isolation element an energy storage element is provided in the form of a capacitor or a battery, in which a stabilized intermediate voltage is provided for the supply of the second converter stage.

5. The operating device according to claim 1, wherein the illuminant can be supplied selectively starting from an energy store via the second converter stage or directly starting from a supply or mains voltage via the first converter stage.

6. The operating device according to claim 1, wherein the first converter stage is a combined converter stage, which forms a combined fly-back converter or forward converter, wherein one of fly-back converter and forward converter supplies the illuminant directly and the other charges an energy store.

7. An emergency lighting unit, providing an operating device according to claim 1.

8. An integrated control unit which is designed for an operating device according to claim 1.

9. The integrated control unit according to claim 8 which is an ASIC.

10. An operating device for operating a light source, comprising:

a first power converter stage supplied with mains voltage with a first reference potential, a second power converter stage with a second reference potential, which is connected to the secondary side of the first power converter stage via a first potential isolation element, a digital control unit, which without potential isolation controls a power switch of the first power converter stage and via a second potential isolation element the second power converter stage, at least one power switch which clocks the converter stage, and an illuminant, which is supplied with energy by the second converter stage.

11. The operating device according to claim 10, wherein signals are fed back to the control unit, which are all picked up on the primary side of the first potential isolation element.

12. The operating device according to claim 10, wherein signals from the secondary side of the first potential isolation element are fed back to the control unit with potential isolation or in an optical manner.

13. The operating device according to claim 12, wherein the first converter stage and the first potential isolation unit are designed in the form of a forward converter.

14. The operating device according to claim 13, wherein the forward converter is operated in a discontinuous manner.

15. The operating device according to claim 10, wherein the light source is a LED, the control system is a digital control system and wherein the first converter stage and the first potential isolation unit are integrated in a circuit.

16. The operating device according to claim 10 to which external information or instructions are supplied.

17. An operating device for operating a light source, comprising:

a first power converter stage with a first reference potential, a second power converter stage, which is connected to the first power converter stage, a control unit, which without potential isolation controls a power switch of the first power converter stage and via a second potential isolation element at least one power switch, which clocks the power converter stage, and an illuminant, in particular an LED, which is supplied with energy by the second power converter stage and connected to a second reference potential, which is isolated relative to the first power converter stage via a first potential isolation unit.

18. The operating device according to claim 17, wherein the second potential isolation unit is integrated in the control unit, for example, by means of integrated air-core coil or formed as an external transformer.

19. The operating device according to claim 17, wherein signals from the secondary side of the potential isolation element and accordingly with reference to the second reference potential are supplied to the control unit with potential isolation or in an optical manner.

* * * * *

UNITED STATES PATENT AND TRADEMARK OFFICE
CERTIFICATE OF CORRECTION

PATENT NO. : 8,384,302 B2
APPLICATION NO. : 12/664346
DATED : February 26, 2013
INVENTOR(S) : Zudrell-Koch et al.

It is certified that error appears in the above-identified patent and that said Letters Patent is hereby corrected as shown below:

<u>Title Page:</u>
Item (73) Assignee, change "Tridonic GmbH & Co KG" to -- TridonicAtco GmbH & Co KG --.

Signed and Sealed this
Twenty-first Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,384,302 B2
APPLICATION NO. : 12/664346
DATED             : February 26, 2013
INVENTOR(S)       : Zudrell-Koch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 537 days.

Signed and Sealed this
First Day of September, 2015

Michelle K. Lee
*Director of the United States Patent and Trademark Office*